No. 799,798. PATENTED SEPT. 19, 1905.
W. J. MORRISON.
LIQUID HEATER AND STRAINER.
APPLICATION FILED NOV. 7, 1904.
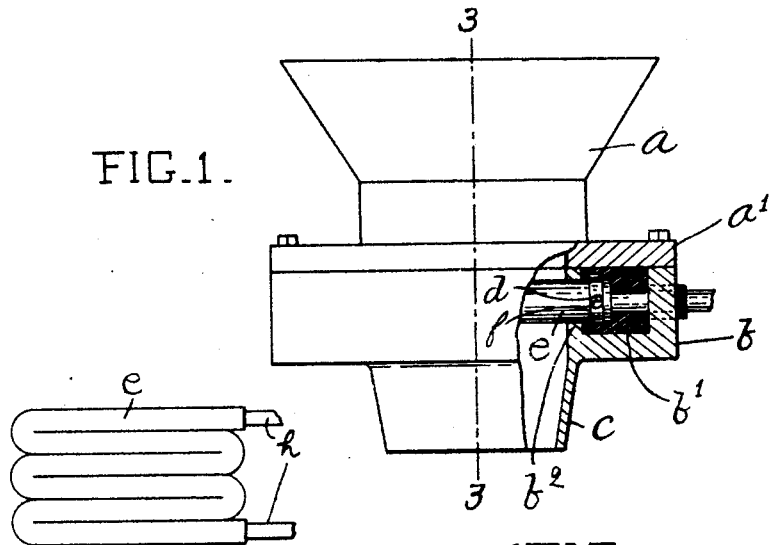
FIG. 1.
FIG. 5.
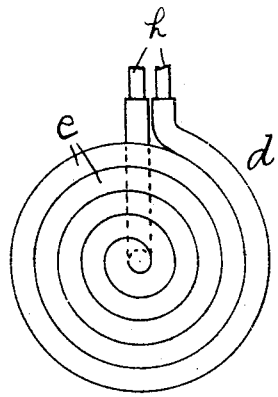
FIG. 6.
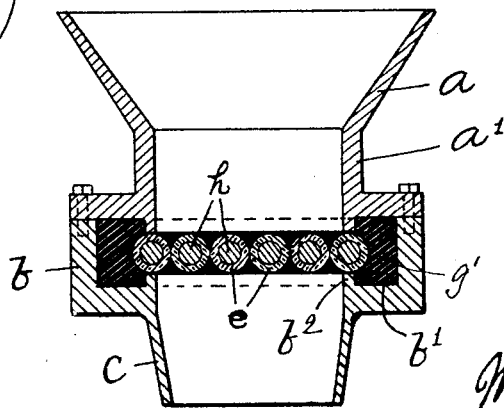
FIG. 3.
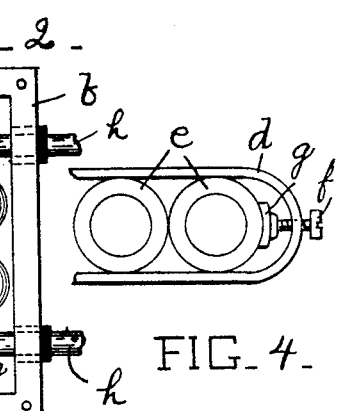
FIG. 2.
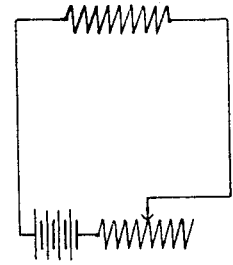
FIG. 4.
FIG. 7.
Witnesses:
H. B. Davis.
M. M. Piper.
Inventor:
W. J. Morrison
by Roger & Hamman
Attys

UNITED STATES PATENT OFFICE.

WILLIAM J. MORRISON, OF NASHVILLE, TENNESSEE.

LIQUID HEATER AND STRAINER.

No. 799,798.         Specification of Letters Patent.         Patented Sept. 19, 1905.

Application filed November 7, 1904. Serial No. 231,608.

*To all whom it may concern:*

Be it known that I, WILLIAM J. MORRISON, of Nashville, county of Davidson, State of Tennessee, have invented an Improvement in Liquid Heaters and Strainers, of which the following description, in connection with the accompanying drawings, is a specification, like characters on the drawings representing like parts.

In straining certain liquids it is desirable that they be heated to a certain temperature as they are passing through the strainer. It is further desirable in many instances that the strainer be of such a material that it will be unaffected by the substance or liquid which is strained and that the strainer may be easily and perfectly cleaned.

The object of my invention is to provide a strainer with means whereby the liquid to be strained may be heated thereby to any desired temperature within certain limits and while it is passing therethrough.

A further object of my invention is to provide a form of strainer which is of non-absorbent material and which may be easily and perfectly cleaned.

I accomplish these objects by providing a form of strainer made up of a series of contiguously-arranged sections of non-absorbent insulating material in which a suitably-controlled electrically-heated conductor is embedded.

In the drawings, Figure 1 is a side elevation, partly in section, of a strainer made according to my invention. Fig. 2 is a top plan view of the strainer. Fig. 3 is a vertical section on the line 3 3 of Fig. 1. Fig. 4 is a detail view of the bar-holding clip. Figs. 5 and 6 illustrate modified forms of my invention. Fig. 7 is a diagrammatical view of the electrical apparatus which I employ.

The strainer comprises a suitable open-bottomed receptacle $a$, the lower end of which is provided with a rectangular flange $a'$, which is seated in and tightly secured to a rectangular frame $b$, the lower end of said frame being provided with a discharge-tube $c$, which registers with a rectangular passage-way therethrough. A series of cylindrical sections or bars $e$, preferably of tubular glass, are arranged close together side by side, they preferably being held in parallelism with their center lines in the same plane by means of rings $d$, in which the ends of said bars are inserted, said rings having straight parallel sides arranged at a distance apart equal the diameter of the bars $e$ and having semicircular ends. A screw $f$ is preferably threaded into one end of each ring and a follower $g$ is provided for said screw, whereby the closeness with which said bars may be pressed together may to an extent be varied. The upper side of said frame $b$ is provided with a rectangularly-shaped groove or recess $b'$, the inner side of which is bounded by a vertical rib $b^2$, which forms a portion of the side of the passage through the frame $b$. The ends of the series of bars and the side bars of said series rest on said rib $b^2$ and a suitable packing $g'$, of insulating material which is impervious to water and is unaffected by heat, is provided in said groove, the ends of said bars and the outer sides of the side bars being embedded therein. The flange $a'$ is clamped onto the frame $b$, so that a water-tight connection is provided between said bars and the walls of the passage through the receptacle $a$ and frame $b$.

A suitable highly-resistive electric conductor $h$ is embedded in said tubular bars $e$, said conductor being thereby insulated from the liquid which passes through the spaces between the bars.

The conductor or heater $h$ is connected to a suitable source of electricity, and a suitable variable resistance is interposed in the connections therebetween, as indicated diagrammatically in Fig. 7, so that the temperature of the heater $h$, and therefore of the sections of the filter-bed, may be varied according to the special conditions required.

In operation the electric current is passed through said conductor $h$, and consequently the bars $e$ become heated, the temperature of the bars being regulated to suit the requirements by the rheostat, the bars in turn heating the liquid or other matter which may come in contact therewith to the desired temperature while it is being strained. The bars $e$ may be held together so closely that practically all the solid matter in the liquid which is strained will be arrested by the bars as the liquid passes through the spaces therebetween.

As the liquid may be heated to any desired temperature as it passes through the strainer, I am thereby enabled to separate substances which cannot otherwise be separated by straining or filtration, so far as I am aware. Moreover, as the conductor $h$ will be heated to the same temperature throughout its length, the temperature of all portions of the strainer will be the same, so that all portions of the liquid passing therethrough will be heated uniformly.

As the entire strainer is of glass, it will be apparent that it may be easily and perfectly cleaned, as the elements or compounds which unite with glass or tend to adhere thereto are seldom present in compounds to be strained or filtered. The cross-sectional form of said bars or tubes and the particular manner in which they are arranged may be varied without departing from the spirit and scope of my invention. For example, a glass tube may be bent upon itself, as shown in Fig. 5, or coiled spirally, as shown in Fig. 6, the electrically-resistive conductor extending therethrough, as in the form of my invention first described. In either instance a water-tight connection is provided between the edge portion of the strainer thus formed and the casing, the straining and heating action being the same as that already described.

Having thus described my invention, what I claim as new, and desire to secure by Letters Patent, is—

1. A liquid heater and strainer composed of an imperviously-insulated, electrically-heated conductor having its coils arranged to provide straining-passages, substantially as described.

2. A liquid heater and strainer composed of a series of sections disposed in juxtaposition to provide filtering-passages therebetween, and an electrically-heated conductor embedded in said sections, substantially as described.

3. A liquid heater and strainer composed of a series of glass tubes disposed in juxtaposition to provide straining-passages therebetween, and an electrically-heated conductor in said tubes, substantially as described.

In testimony whereof I have signed my name to this specification in the presence of two subscribing witnesses.

WM. J. MORRISON.

Witnesses:
    LOUIS H. HARRIMAN,
    H. B. DAVIS.